United States Patent
Ferris et al.

(10) Patent No.: US 9,606,831 B2
(45) Date of Patent: Mar. 28, 2017

(54) MIGRATING VIRTUAL MACHINE OPERATIONS

(75) Inventors: James Michael Ferris, Cary, NC (US); Gerry Edward Riveros, Raleigh, NC (US)

(73) Assignee: Red Hat, Inc., Raleigh, NC (US)

(*) Notice: Subject to any disclaimer, the term of this patent is extended or adjusted under 35 U.S.C. 154(b) by 162 days.

(21) Appl. No.: 12/957,267

(22) Filed: Nov. 30, 2010

(65) Prior Publication Data
US 2012/0136989 A1    May 31, 2012

(51) Int. Cl.
*G06F 11/30*    (2006.01)
*G06F 9/48*    (2006.01)
*G06F 11/34*    (2006.01)

(52) U.S. Cl.
CPC ........ *G06F 9/4856* (2013.01); *G06F 11/3409* (2013.01); *G06F 11/3433* (2013.01); *G06F 2201/815* (2013.01)

(58) Field of Classification Search
CPC ......... G06F 2009/45562; G06F 8/4434; G06F 11/3447; G06F 15/7867
USPC .......................... 709/220–226; 713/1, 2, 100
See application file for complete search history.

(56) References Cited

U.S. PATENT DOCUMENTS

| | | | |
|---|---|---|---|
| 6,463,457 B1 | 10/2002 | Armentrout et al. | |
| 7,313,796 B2 | 12/2007 | Hamilton et al. | |
| 7,439,937 B2 | 10/2008 | Ben-Shachar et al. | |
| 7,529,785 B1 | 5/2009 | Spertus et al. | |
| 7,546,462 B2 | 6/2009 | Upton | |
| 7,574,496 B2* | 8/2009 | McCrory et al. | 709/223 |
| 7,596,620 B1 | 9/2009 | Colton et al. | |
| 8,099,487 B1* | 1/2012 | Smirnov et al. | 709/223 |
| 8,135,930 B1* | 3/2012 | Mattox et al. | 711/162 |
| 8,166,477 B1* | 4/2012 | Tormasov | 718/1 |
| 8,171,201 B1* | 5/2012 | Edwards, Sr. | 711/6 |
| 8,209,415 B2* | 6/2012 | Wei | 709/224 |
| 8,234,236 B2* | 7/2012 | Beaty | G06F 9/5077 706/45 |
| 8,296,759 B1* | 10/2012 | Hutchins et al. | 718/1 |
| 8,352,608 B1* | 1/2013 | Keagy et al. | 709/226 |
| 8,396,807 B1* | 3/2013 | Yemini et al. | 705/59 |
| 9,104,458 B1* | 8/2015 | Brandwine | G06F 9/45558 |
| 2001/0039497 A1 | 11/2001 | Hubbard | |

(Continued)

OTHER PUBLICATIONS

"rBuilder and the rPath Appliance Platform", 2007 rPath, Inc., www.rpath.com, 3 pgs.

(Continued)

*Primary Examiner* — Khaled Kassim
*Assistant Examiner* — Zhaohui Yang
(74) *Attorney, Agent, or Firm* — Lowenstein Sandler LLP (57) ABSTRACT

Embodiments relate to systems and methods for reclassifying a set of virtual machines in a cloud-based network. The systems and methods can analyze virtual machine data to determine performance metrics associated with the set of virtual machines, as well as target data to determine a set of target machines to which the set of virtual machines can be reassigned or reclassified. In embodiments, benefits of reassigning any of the set of virtual machines to any of the set of target virtual machines can be determined. Based on the benefits, the systems and methods can reassign or reclassify appropriate virtual machines to appropriate target virtual machines.

14 Claims, 5 Drawing Sheets

(56) References Cited

U.S. PATENT DOCUMENTS

| | | |
|---|---|---|
| 2002/0069276 A1 | 6/2002 | Hino et al. |
| 2002/0165819 A1 | 11/2002 | McKnight et al. |
| 2003/0037258 A1 | 2/2003 | Koren |
| 2003/0110252 A1 | 6/2003 | Yang-Huffman |
| 2003/0135609 A1 | 7/2003 | Carlson et al. |
| 2004/0162902 A1 | 8/2004 | Davis |
| 2004/0210591 A1 | 10/2004 | Hirschfeld et al. |
| 2004/0210627 A1 | 10/2004 | Kroening |
| 2004/0268347 A1 | 12/2004 | Knauerhase et al. |
| 2005/0131898 A1 | 6/2005 | Fatula |
| 2005/0144060 A1 | 6/2005 | Chen et al. |
| 2005/0182727 A1 | 8/2005 | Robert et al. |
| 2005/0289540 A1 | 12/2005 | Nguyen et al. |
| 2006/0026387 A1* | 2/2006 | Dinechin et al. ............... 712/1 |
| 2006/0075042 A1 | 4/2006 | Wang et al. |
| 2006/0085530 A1 | 4/2006 | Garrett |
| 2006/0085824 A1 | 4/2006 | Bruck et al. |
| 2006/0130144 A1 | 6/2006 | Wernicke |
| 2006/0177058 A1 | 8/2006 | Sarwono et al. |
| 2006/0224436 A1 | 10/2006 | Matsumoto et al. |
| 2006/0294516 A1* | 12/2006 | Winner et al. ............... 718/1 |
| 2007/0011291 A1 | 1/2007 | Mi et al. |
| 2007/0028001 A1 | 2/2007 | Phillips et al. |
| 2007/0226715 A1 | 9/2007 | Kimura et al. |
| 2007/0283282 A1 | 12/2007 | Bonfiglio et al. |
| 2007/0294676 A1 | 12/2007 | Mellor et al. |
| 2008/0080396 A1 | 4/2008 | Meijer et al. |
| 2008/0080718 A1 | 4/2008 | Meijer et al. |
| 2008/0082538 A1 | 4/2008 | Meljer et al. |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1 | 4/2008 | Lam et al. |
| 2008/0091613 A1 | 4/2008 | Gates et al. |
| 2008/0104608 A1 | 5/2008 | Hyser et al. |
| 2008/0215796 A1 | 9/2008 | Lam et al. |
| 2008/0240150 A1 | 10/2008 | Dias et al. |
| 2009/0012885 A1 | 1/2009 | Cahn |
| 2009/0025006 A1 | 1/2009 | Waldspurger |
| 2009/0037496 A1 | 2/2009 | Chong et al. |
| 2009/0064132 A1* | 3/2009 | Suchy et al. ............... 717/177 |
| 2009/0070771 A1* | 3/2009 | Yuyitung et al. ............. 718/105 |
| 2009/0089078 A1 | 4/2009 | Bursey |
| 2009/0099940 A1 | 4/2009 | Frederick et al. |
| 2009/0132695 A1 | 5/2009 | Surtani et al. |
| 2009/0177514 A1 | 7/2009 | Hudis et al. |
| 2009/0210527 A1 | 8/2009 | Kawato |
| 2009/0210875 A1 | 8/2009 | Bolles et al. |
| 2009/0217267 A1 | 8/2009 | Gebhart et al. |
| 2009/0222805 A1 | 9/2009 | Faus et al. |
| 2009/0228950 A1 | 9/2009 | Reed et al. |
| 2009/0248693 A1 | 10/2009 | Sagar et al. |
| 2009/0249287 A1 | 10/2009 | Patrick |
| 2009/0260007 A1 | 10/2009 | Beaty et al. |
| 2009/0265707 A1* | 10/2009 | Goodman et al. ............... 718/1 |
| 2009/0271324 A1 | 10/2009 | Jandhyala |
| 2009/0276771 A1 | 11/2009 | Nickolov et al. |
| 2009/0287691 A1 | 11/2009 | Sundaresan et al. |
| 2009/0293056 A1 | 11/2009 | Ferris |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300607 A1 | 12/2009 | Ferris et al. |
| 2009/0300608 A1 | 12/2009 | Ferris et al. |
| 2009/0300635 A1 | 12/2009 | Ferris |
| 2009/0300641 A1 | 12/2009 | Friedman et al. |
| 2009/0300719 A1 | 12/2009 | Ferris |
| 2009/0328056 A1* | 12/2009 | McCune et al. ............. 718/105 |
| 2010/0042720 A1 | 2/2010 | Stienhans et al. |
| 2010/0050172 A1 | 2/2010 | Ferris |
| 2010/0057831 A1 | 3/2010 | Williamson |
| 2010/0058347 A1 | 3/2010 | Smith et al. |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0217850 A1 | 8/2010 | Ferris |
| 2010/0217864 A1 | 8/2010 | Ferris |
| 2010/0217865 A1 | 8/2010 | Ferris |
| 2010/0220622 A1 | 9/2010 | Wei |
| 2010/0299366 A1 | 11/2010 | Stienhans et al. |
| 2010/0306354 A1 | 12/2010 | DeHaan et al. |
| 2010/0306377 A1 | 12/2010 | DeHaan et al. |
| 2010/0306379 A1 | 12/2010 | Ferris |
| 2010/0306566 A1 | 12/2010 | DeHaan et al. |
| 2010/0306765 A1 | 12/2010 | DeHaan |
| 2010/0306767 A1 | 12/2010 | DeHaan |
| 2011/0016214 A1 | 1/2011 | Jackson |
| 2011/0055034 A1 | 3/2011 | Ferris et al. |
| 2011/0055377 A1 | 3/2011 | DeHaan |
| 2011/0055378 A1 | 3/2011 | Ferris et al. |
| 2011/0055396 A1 | 3/2011 | DeHaan |
| 2011/0055398 A1 | 3/2011 | DeHaan et al. |
| 2011/0055588 A1 | 3/2011 | DeHaan |
| 2011/0093849 A1* | 4/2011 | Chawla et al. ............... 718/1 |
| 2011/0131335 A1 | 6/2011 | Spaltro et al. |

OTHER PUBLICATIONS

White Paper—"Best Practices for Building Virtual Appliances", 2008 rPath, Inc., www.rpath.com, 6 pgs.

DeHaan et al., "Systems and Methods for Secure Distributed Storage", U.S. Appl. No. 12/610,081, filed Oct. 30, 2009.

Ferris et al., "Methods and Systems for Monitoring Cloud Computing Environments" U.S. Appl. No. 12/627,764, filed Nov. 30, 2009.

Ferris et al., "Methods and Systems for Detecting Events in Cloud Computing Environments and Performing Actions Upon Occurrence of the Events", U.S. Appl. No. 12/627,646, filed Nov. 30, 2009.

Ferris et al, "Methods and Systems for Verifying Software License Compliance in Cloud Computing Environments", U.S. Appl. No. 12/627,643, filed Nov. 30, 2009.

Ferris et at, "Systems and Methods for Service Aggregation Using Graduated Service Levels in Cloud Network", U.S. Appl. No. 12/628,112, filed Nov. 30, 2009.

Ferris et al, "Methods and Systems for Generating a Software License Knowledge Base for Verifying Software License Compliance in Cloud Computing Environments", U.S. Appl. No. 12/628,156, filed Nov. 30, 2009.

Ferris et al, "Methods and Systems for Converting Standard Software Licenses for Use in Cloud Computing Environments", U.S. Appl. No. 12/714,099, filed Feb. 25, 2010.

Ferris et al, "Systems and Methods for Managing a Software Subscription in a Cloud Network", U.S. Appl. No. 12/714,096, filed Feb. 26, 2010.

Ferris et al., "Methods and Systems for Providing Deployment Architectures in Cloud Computing Environments", U.S. Appl. No. 12/714,427, filed Feb. 26, 2010.

Ferris et al., "Methods and Systems for Matching Resource Requests with Cloud Computing Environments", U.S. Appl. No. 12/714,113, filed Feb. 26, 2010.

Ferris et al., "Systems and Methods for Generating Cross-Cloud Computing Appliances", U.S. Appl. No. 12/714,315, filed Feb. 26, 2010.

Ferris et al., "Systems and Methods for Cloud-Based Brokerage Exchange of Software Entitlements", U.S. Appl. No. 12/714,302, filed Feb. 26, 2010.

(56) References Cited

OTHER PUBLICATIONS

Ferris et al., "Methods and Systems for Offering Additional License Terms During Conversion of Standard Software Licenses for Use in Cloud Computing Environments", U.S. Appl. No. 12/714,065, filed Feb. 26, 2010.
Ferris et al., "Systems and Methods for or a Usage Manager for Cross-Cloud Appliances", U.S. Appl. No. 12/714,334, filed Feb. 26, 2010.
Ferris et al., "Systems and Methods for Delivery of User-Controlled Resources in Cloud Environments Via a Resource Specification Language Wrapper", U.S. Appl. No. 12/790,294, filed May 28, 2010.
Ferris et al., "Systems and Methods for Managing Multi-Level Service Level Agreements in Cloud-Based Networks", U.S. Appl. No. 12/789,660, filed May 28, 2010.
Ferris et al., "Methods and Systems for Generating Cross-Mapping of Vendor Software in a Cloud Computing Environment", U.S. Appl. No. 12/790,527, filed May 28, 2010.
Ferris et al., "Methods and Systems for Cloud Deployment Analysis Featuring Relative Cloud Resource Importance", U.S. Appl. No. 12/790,366, filed May 28, 2010.
Ferris et al., "Systems and Methods for Generating Customized Build Options for Cloud Deployment Matching Usage Profile Against Cloud Infrastructure Options", U.S. Appl. No. 12/789,701, filed May 28, 2010.
Ferris et al., "Systems and Methods for Exporting Usage History Data as Input to a Management Platform of a Target Cloud-Based Network", U.S. Appl. No. 12/790,415, filed May 28, 2010.
Ferris et al., "Systems and Methods for Cross-Vendor Mapping Service in Cloud Networks", U.S. Appl. No. 12/790,162, filed May 28, 2010.
Ferris et al., "Systems and Methods for Cross-Cloud Vendor Mapping Service in a Dynamic Cloud Marketplace", U.S. Appl. No. 12/790,229, filed May 28, 2010.
Ferris et al., "Systems and Methods for Aggregate Monitoring of Utilization Data for Vendor Products in Cloud Networks", U.S. Appl. No. 12/790,039, filed May 28, 2010.
Ferris et al., "Systems and Methods for Combinatorial Optimization of Multiple Resources of Multiple Across a Set of Cloud-Based Networks", U.S. Appl. No. 12/953,718, filed Nov. 24, 2010.
Ferris et al., "Systems and Methods for Matching a Usage History to a New Cloud" U.S. Appl. No. 12/953,757, filed Nov. 24, 2010.
Ferris et al., "Systems and Methods for Identifying Usage Histories for Producing Optimized Cloud Utilization", U.S. Appl. No. 12/952,930, filed Nov. 23, 2010.
Ferris et al., "Systems and Methods for Identifying Service Dependencies in a Cloud Deployment", U.S. Appl. No. 12/952,857, filed Nov. 23, 2010.
Ferris et al., "System and Methods for Migrating Subscribed Services in a Cloud Deployment", U.S. Appl. No. 12/955,277, filed Nov. 29, 2010.
Ferris et al., "Systems and Methods for Mirgrating Subscribed Services from a Set of Clouds to a Second Set of Clouds", U.S. Appl. No. 12/957,281, filed Nov. 30, 2010.
Morgan, "Systems and Methods for Generating Multi-Cloud Incremental Billing Capture and Administration", U.S. Appl. No. 12/954,323, filed Nov. 24, 2010.
Morgan, "Systems and Methods for Aggregating Marginal Subscription Offsets in Set of Multiple Host Clouds", U.S. Appl. No. 12/954,400, filed Nov. 24, 2010.
Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.
Morgan, "Systems and Methods for Managing Subscribed Resource Limits in Cloud Network Using Variable or Instantaneous Consumption Tracking Periods", U.S. Appl. No. 12/954,352, filed Nov. 24, 2010.
Ferris et al. "Systems and Methods for Migrating Software Modules into One or More Clouds", U.S. Appl. No. 12/952,701, filed Nov. 23, 2010.
Ferris et al., "Systems and Methods for Brokering Optimized Resource Supply Costs in Host Cloud-Based Network Using Predictive Workloads", U.S. Appl. No. 12/957,274, filed Nov. 30, 2010.
Morgan, "Systems and Methods for Generating Optimized Resource Consumption Periods for Multiple Users on Combined Basis", U.S. Appl. No. 13/037,359, filed Mar. 1, 2011.
Morgan, "Systems and Methods for Metering Cloud Resource Consumption Using Multiple Hierarchical Subscription Periods", U.S. Appl. No. 13/037,360, filed Mar. 1, 2011.
Morgan, "Systems and Methods for Generating Marketplace Brokerage Exchange of Excess Subscribed Resources Using Dynamic Subscription Penods", U.S. Appl. No. 13/037,351, filed Feb. 28, 2011.
Morgan, "Systems and Methods for Detecting Resource Consumption Events Over Sliding Intervals in Cloud-Based Network", U.S. Appl. No. 13/149,235, filed May 31, 2011.
Morgan, "Systems and Methods for Triggering Workload Movement Based on Policy Stack Having Multiple Selectable Inputs", U.S. Appl. No. 13/149,418, filed May 31, 2011.
Morgan, "Systems and Methods for Cloud Deployment Engine for Selective Workload Migration or Federation Based on Workload Conditions", U.S. Appl. No. 13/117,937, filed May 27, 2011.
Morgan, "Systems and Methods for Tracking Cloud Installation Information Using Cloud-Aware Kernel of Operating System", U.S. Appl. No. 13/149,750, filed May 31, 2011.
Morgan, "Systems and Methods for Introspective Application Reporting to Facilitate Virtual Machine Movement Between Cloud Hosts", U.S. Appl. No. 13/118,009, filed May 27, 2011.
Morgan, "Systems and Methods for Self-Moving Operating System Installation in Cloud-Based Network", U.S. Appl. No. 13/149,877, filed May 31, 2011.
Healey, Matt, White Paper—"Virtualizing Support", Sponsored by Bomgar, Mar. 2008, .Copyrgt. 2008 IDC, Paper No. 211403, 9 pages.

* cited by examiner

MIGRATING VIRTUAL MACHINE OPERATIONS

FIELD

The present teachings relate to systems and methods for reclassifying virtual machines to target virtual machines, and more particularly to platforms and techniques for reassigning virtual machines or appliances based on a code analysis.

BACKGROUND OF RELATED ART

Cloud computing environments utilize shared resources, software, and information that can be provided for use by end users. For example, a service level agreement (SLA) can be entered into between a vendor, such as an independent software vendor (ISV), and a cloud network provider whereby the cloud network provider agrees to commit an amount of resources associated with virtual machines in the cloud network for use by end users during operation of software products and applications of the vendor. In return, the cloud network provider can charge the vendor a specified rate in proportion to the amount of committed resources. The cloud network provider provides or maintains an amount of resources in the cloud network, such as server uptime, persistent storage, software application instantiation, network performance, cloud storage, support response time, and other elements.

A class of virtual machines can be instantiated in a cloud network for use by end users. In particular, the virtual machines can have specified sets of applications, operating systems, and other software and hardware modules. An administrator of the cloud network may wish to optimize usage of the class of virtual machines. More particularly, the administrator may wish to ensure that the end users are efficiently operating the class of virtual machines. However, it is sometimes the case that the actual usage of the virtual machines by the end users is not efficient or optimized. Further, the administrator of the cloud network may desire to locate or instantiate additional virtual machines that efficiently support usage by the end users.

Therefore, it may be desirable to provide systems and methods for reclassifying virtual machines to target virtual machines. In particular, it may be desirable to reclassify some or all of a set of virtual machines based on a code analysis of resources of the set of virtual machines, from which an advantage, benefit, efficiency gain, and/or other effect can be realized.

DESCRIPTION OF EMBODIMENTS

Embodiments of the present teachings relate to systems and methods for reclassifying virtual machines to target virtual machines. In particular, embodiments relate to reassigning virtual machines or appliances based on a code analysis, from which an advantage, benefit, efficiency gain, and/or other effect can be realized. A cloud network can have a specified amount of virtual machines or other resources to execute software modules and to be utilized by, for example, end users. For example, the virtual machines and other resources of the cloud network can be deployed as a Software as a Service (SaaS). An administrator of the cloud network can desire to reclassify some or all of the virtual machines or other resources to tarqet virtual machines or other resources.

According to embodiments, a virtual machine (VM) management tool or other logic can analyze a set of virtual machines or other resources in a host cloud to determine resource consumption metrics of the virtual machines or other resources. The VM management tool can determine which of the set of virtual machines or other resources may benefit from a reclassification to a different class or type of virtual machine or other resources. In embodiments, the VM management tool can locate target virtual machines within the host cloud or other clouds that can support operations of the existing virtual machines. The VM management tool can reassign or reclassify the existing virtual machines to the target virtual machines to better utilize end user operation patterns and metrics.

In embodiments, the VM management tool can be configured to provide relevant data or information to an administrator of any of the clouds or virtual machines such that the administrator can determine a reclassification or reassignment plan for any of the virtual machines. For example, the administrator may wish to use virtual machine analysis data or other data to examine or generate a business model based on an hourly rate, consumption rate, or other metrics, and determine potential candidate virtual machines based on any relevant business models.

Embodiments as described herein can be implemented in or supported by a cloud network architecture. As used herein, a "cloud" can for instance refer to a cloud-based network comprising a collection of resources that can be invoked to instantiate a virtual machine, process, appliance, or other resource for a limited or defined duration. As used herein, an "end user" can for instance refer to a person, customer, subscriber, corporation, organization, or other entity accessing files and/or devices storing the files in the cloud. In embodiments, the end user can operate or manage computer software or hardware that can access files and/or devices storing the files in the cloud-based network. Further, as used herein, an "administrator" of a cloud can for instance refer to a person, owner, corporation, organization, or other entity having authoritative power to initialize, oversee, or otherwise manage the operation of a cloud.

As used herein, the "system" of a cloud can for instance refer to software and hardware as a whole such as, for example, virtual machines, appliances, applications, programs, servers, device drivers, storage such as hard drives, virtual memory, databases, random access memory (RAM) and other memory, processors, multimedia cards, and the like, in the cloud. The system can be accessed by users or by software or applications independent from or associated with the system of the cloud. In embodiments, vendors such as ISVs can supply software resources for use with the system in the cloud. The system can further comprise any communications resources, such as ports or channels provided to a virtual machine or other machine or process in the cloud. The system can also support services, such as Web-based services deployed in the cloud, for example security or identity management services and/or other resources. As used herein, a "module" or "software module" can for instance refer to any type of software application, program, computer code, and the like, that is part of the system of the cloud. The software modules can be executed by users, the system itself, an administrator, or any other entity.

As used herein, an "analysis" can for instance be any static or dynamic analysis performed on a software module, program data, or program code that can be examined to determine an advantage, benefit, efficiency gain, and/or other effect of a reclassification or reassignment. As used herein, "optimize" can for instance be a general term that can refer to the best available option. In other words, an "optimized" configuration need not represent the best possible configuration, but instead can mean the preferred configuration of the possible configurations. Further, the term "optimize" can for instance also mean maximize, enhance, improve, or other terms related to a preferred or improved performance level. Still further, as used herein, a "simulation" can for instance refer to a projection, model, analysis, assessment, breakdown, evaluation, and other terms that can refer to any type of analysis of data.

Figure 1:
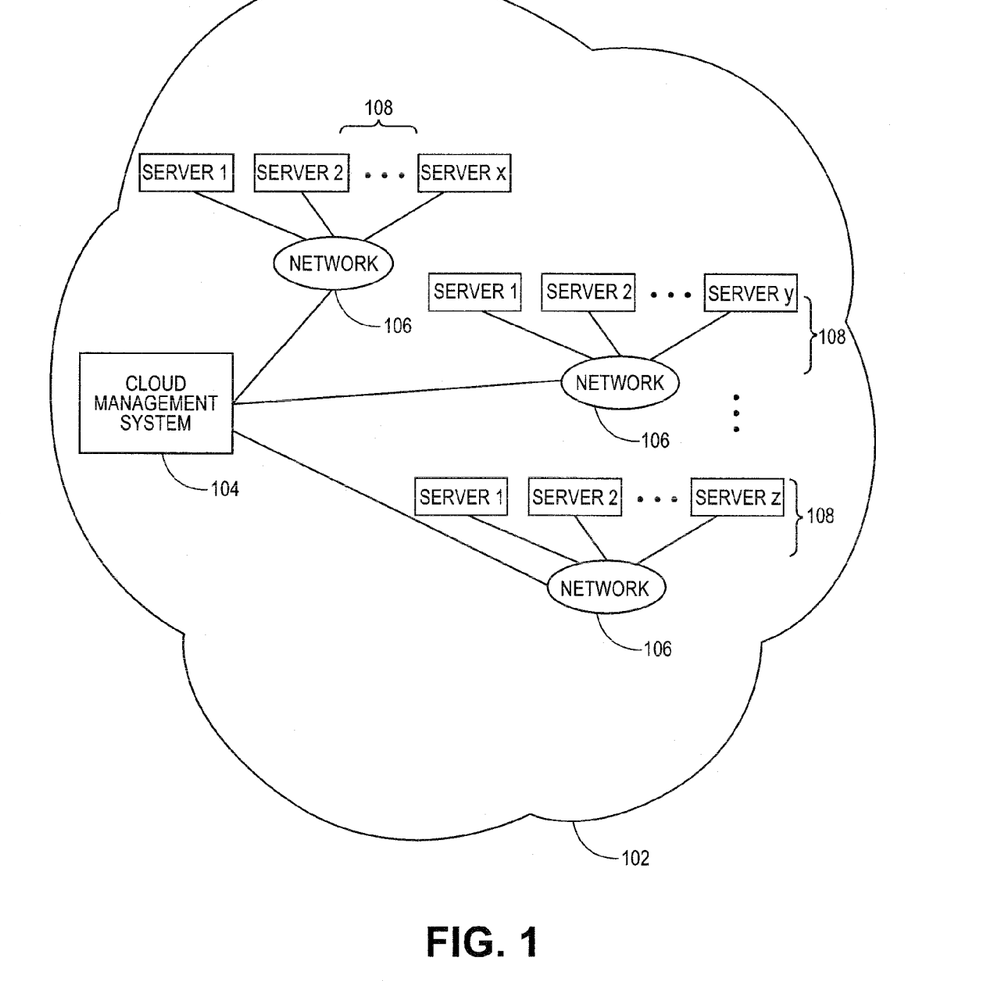
FIG. 1 illustrates an overall cloud system architecture in which various embodiments of the present teachings can be practiced.

FIG. 1 illustrates an overall cloud system architecture in which various embodiments of the present teachings can be practiced. As shown for example in FIG. 1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines is managed by a cloud management system 104. The cloud management system 104 can comprise a dedicated or centralized server and/or other software, hardware, and network tools that communicate via network 106 such as the Internet or other public or private network with all sets of resource servers to manage the cloud 102 and its operation. To instantiate a new set of virtual machines, a user can transmit an instantiation request to the cloud management system 104 for the particular type of virtual machine that the user desires to invoke for its intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user desires to be available to each instance of the virtual machine or other resource. In embodiments, the requesting user can for instance specify a service level agreement (SLA) acceptable for their purposes. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more of the set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on-demand basis. For example, one set of resource servers 108 may respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 may respond to a request for instantiation at a programmed time with an offer to deliver the specified quantity of processor cycles within a specific amount of time, such as the next 12 hours.

The cloud management system 104 can select groups of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a Resource aggregation table that identifies the various sets of resource servers
that will be used to supply the components of the virtual machine or process. The sets of resource servers can be identified by unique identifiers such as, for instance, Internet protocol (IP) addresses or other addresses. The cloud management system 104 can register the finalized group of servers in the set of resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in the set of resource servers 108. The cloud management system 104 can receive a confirmation message back from each participating server in the set of resource servers 108 indicating a status regarding the provisioning of their respective resources. Various sets of resource servers may confirm, for example, the availability of a dedicated amount of processor cycles, amounts of electronic memory, communications bandwidth, or applications or other software prepared to be served.

Figure 2:
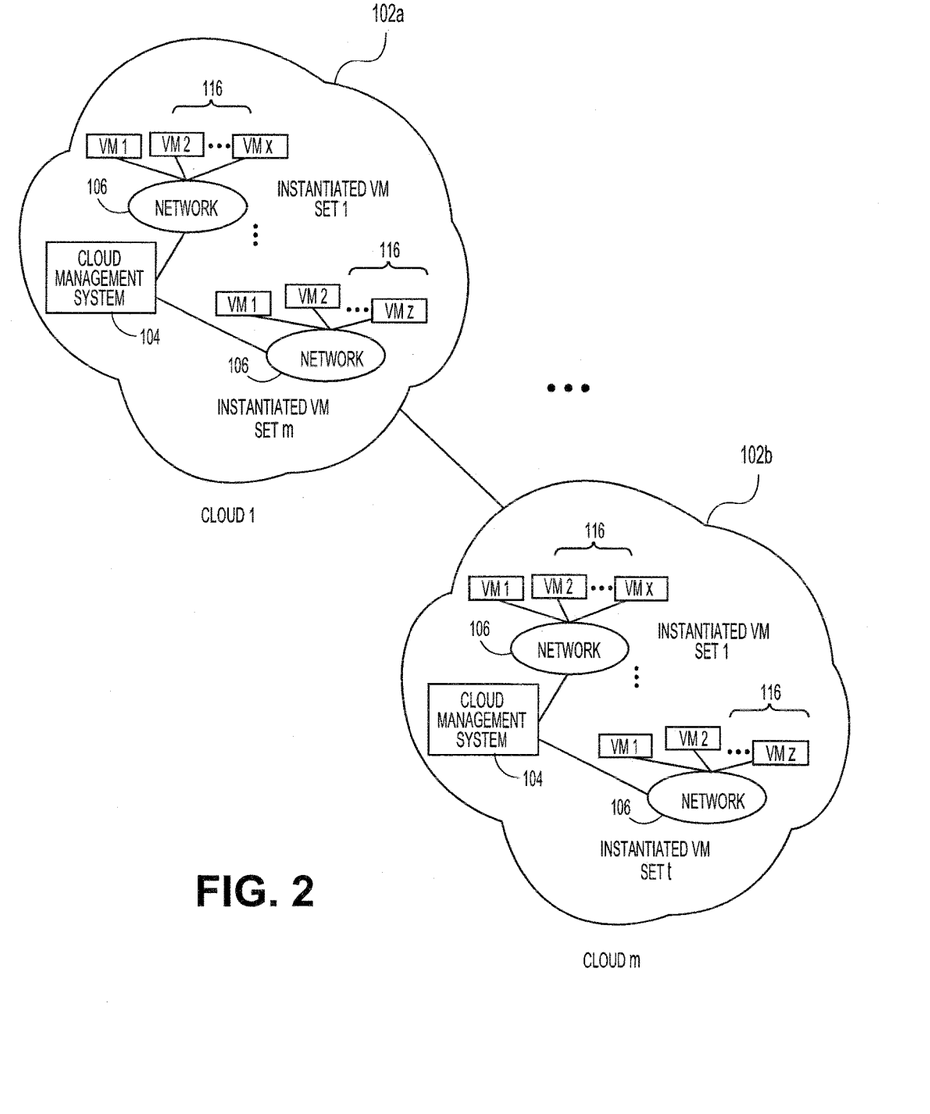
FIG. 2 illustrates an overall cloud system architecture including multiple cloud arrangements in which various embodiments of the present teachings can be practiced in another regard, according to various embodiments.

As shown for example in FIG. 2, the cloud management system 104 can then instantiate one or more than one set of virtual machines 116, or other processes based on the resources supplied by the registered set of resource servers 108 (shown in FIG. 1). In embodiments, the cloud management system 104 can instantiate a given number, for example, 10, 500, 1000, or other numbers of virtual machines to be made available to users on a network 106, such as the internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track, and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the network 106 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102a, 102b or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102a, 102b. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated machines 116, processes, or other resources can be scaled up or down immediately or within a short period of time on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or almost constant, since instances are assembled from abstracted resources that can be selected and maintained from diverse sources based on uniform specifications.

In terms of network management of the set of virtual machines 116 that have been successfully configured and instantiated, the cloud management system 104 can perform various network management tasks including security, maintenance, and metering for billing or subscription purposes. The cloud management system 104 of a given cloud 102a, 102b can, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated virtual machines 116 or other resources on a collective basis, for instance, to push or deliver a software upgrade to all active virtual machines. Other management processes are possible.

In embodiments, more than one set of virtual machines can be instantiated in a given cloud at the same, overlapping, or successive times. The cloud management system 104 can, in such implementations, build, launch, and manage multiple sets of virtual machines based on the same or different underlying set of resource servers 108, with populations of different instantiated virtual machines 116 such as may be requested by different users. The cloud management system 104 can institute and enforce security protocols in a cloud 102*a*, 102*b* hosting multiple sets of virtual machines. Each of the individual sets of virtual machines can be hosted in a respective partition or sub-cloud of the resources of the main cloud 102*a*, 102*b*. The cloud management system 104 of a cloud can for example deploy services specific to isolated or defined sub-clouds, or isolate individual workloads/processes within the cloud to a specific sub-cloud. The subdivision of the cloud 102*a*, 102*b* into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102*a* can also interact with a set of instantiated virtual machines or processes generated in a second, third or further cloud 102*b*. Further, the cloud management system 104 of the first cloud 102*a* can interface with the cloud management system 104 of the second cloud 102*b*, to coordinate those domains and operate the clouds and/or virtual machines or processes on a combined basis. The cloud management system 104 of a given cloud 102*a*, 102*b* can track and manage individual virtual machines or other resources instantiated in that cloud, as well as the set of instantiated virtual machines or other resources in other clouds.

Figure 3:
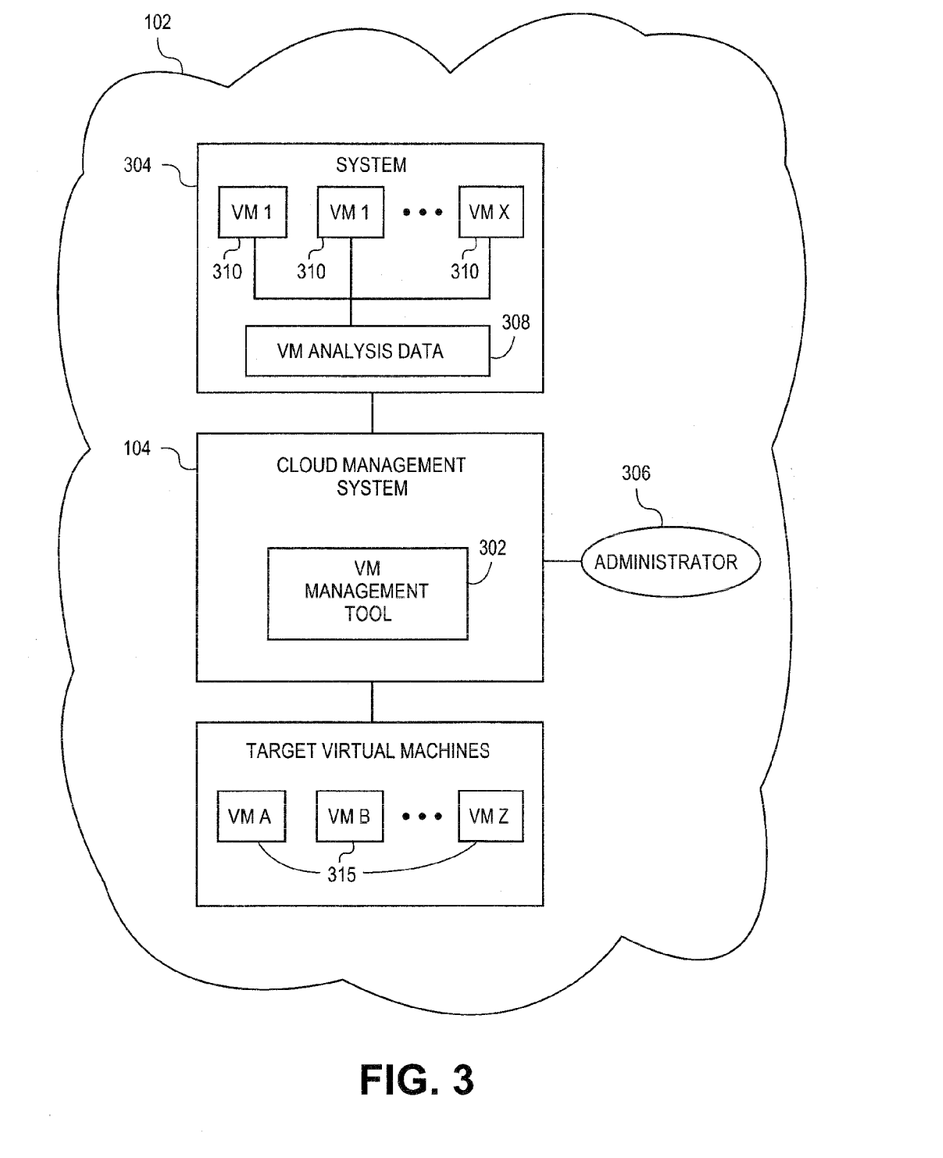
FIG. 3 illustrates an exemplary network configuration that can be used in systems and methods for migrating system software modules into one or more clouds, according to various embodiments.

FIG. 3 illustrates an exemplary network configuration that can be used in systems and methods for reclassifying or reassigning virtual machines to target virtual machines. In embodiments as shown, the cloud management system 104 of a cloud 102 can comprise a VM management tool 302 configured to interface with an administrator 306 and with a system 304. In embodiments, the system 304 can comprise a set of virtual machines 310. It should be appreciated that the VM management tool 302 can be implemented on other hardware and/or software components or can be configured to interface with the other components and entities described herein.

Further, it should be appreciated that the VM management tool 302 can be configured to interface with additional clouds (not shown in figures) and associated system resources, such as virtual machines, of the additional clouds. Further still, it should be clear that although FIG. 3 depicts the VM management tool 302 in association with the cloud management system 104 of the cloud 102, in certain embodiments the VM management tool 302 can instead be associated with one or more additional clouds.

In embodiments, the administrator 306 can be any person, owner, corporation, organization, or other entity having authoritative power to initialize, oversee, or otherwise manage the operation of the cloud 102 and any associated resources. In embodiments, the administrator 306 can manage the delivery or provisioning of software applications, or other software, hardware, or other products or services, such as products and services of one or more ISVs (not shown in figures), to end users accessing the cloud 102. In embodiments, the end users can access the set of virtual machines 310 of the system 304. It should be appreciated that the administrator 306 can enter into one or more service agreements with vendors or other entities to provide resources to end users in one or multiple clouds, and/or across multiple products and/or product lines. It should further be appreciated that the administrator 306 can oversee multiple target or candidate virtual machines or clouds, and can communicate and contact other respective administrators of the multiple target or candidate virtual machines or clouds.

In embodiments, the VM management tool 302 can receive and analyze VM analysis data 308 for potential reclassification or reassignment of one or more of the set of virtual machines 310. In some embodiments, the VM analysis data 308 can comprise data associated with software or hardware modules of the set of virtual machines 310. For example, the VM analysis data 308 can detail the software or hardware modules that execute on or are otherwise supported by the set of virtual machines 310. In some embodiments, the VM analysis data 310 can detail an analysis of program code associated with the software modules. For example, the VM analysis data 310 can include one or more of input/output (I/O) data, memory usage data, storage data, central processing unit (CPU) consumption data and other processing data, redundancy data, network transmission data, and any other data associated with an execution or support of software modules or other resources of the set of virtual machines 310. In some embodiments, the VM analysis data 308 can indicate data relating to the operations of a set of appliances of the system 304.

In embodiments, the VM management tool 302 can statically or dynamically simulate, model, or otherwise analyze the VM analysis data 308 to determine information related to the software or hardware modules of the set of virtual machines 310. For example, the VM management tool 302 can determine, from the VM analysis data 308, how much memory a certain virtual machine uses over a certain time period, and can determine that the virtual machine may benefit from an upgrade or downgrade in the amount of instantiated memory. For further example, the VM management tool 102 can determine, from the VM analysis data 308, the daily average amount of data that another virtual machine transfers, and can determine that the virtual machine can benefit from an upgrade or downgrade in a data transfer capacity. It should be appreciated that the VM management tool 302 can determine any other metrics associated with the software or hardware modules from the VM analysis data 308, or any potential benefits or Improvements for the set of virtual machines 310. In embodiments, the VM management tool 302 can perform a static analysis on a header file, a manifest file, a metadata file, or the like that can specify resources required by a service, an application, and/or a virtual machine.

In embodiments, the VM management tool 302 can receive, determine, or detect data relating to a set of target virtual machines 315. In embodiments, the set of target virtual machines 315 can be in the cloud 102 or in other clouds. The VM management tool 302 can simulate, model, or otherwise analyze the data relating to the set of target virtual machines 315 to determine the ability of the set of target virtual machines 315 to initialize, execute, or otherwise support a reclassification or reassignment of any of the set of virtual machines 310. For example, the VM management tool 302 can detect that one of the set of target virtual machines 315 has the ability to initialize, execute, or otherwise support modules that operate on one of the set of virtual machines 310.

Still further, in embodiments, the VM management tool 302 can perform any sort of benefit simulation, model, or analysis to determine which ones of the set of virtual machines 310 would benefit from a reassignment to, or reconfiguration or reclassification in any of the set of target virtual machines 315. For example, the VM analysis data 308 can reveal that one of the set of virtual machines 310 would benefit from a security-enhanced operating system, and the VM management tool 302 can detect that one of the set of target virtual machines 315 comprises a security-enhanced operating system. The VM management tool 302 can reassign that virtual machine 310 to the detected target virtual machine 315 that comprises the security-enhanced operating system. For further example, the VM analysis data 308 can indicate that one of the set of virtual machines 310 comprises a communication bandwidth that is not being efficiently consumed, and the VM management tool 302 can detect a target virtual machine 315 that comprises a reduced communication bandwidth. The VM management tool 302 can reassign that virtual machine 310 to one of the detected target virtual machine 315 that comprises a lower communication bandwidth. In embodiments, the VM management tool 302 can reclassify any virtual machine 310 in accordance with the selected target virtual machine 315 according to any system or convention. It should be envisioned that the VM management tool 302 can determine any sort of benefit to reassigning any of the set of virtual machines 310 to any of the set of target virtual machines 315.

In embodiments, the VM management tool 302 can instantiate one or more new virtual machines (not shown in figures) to support a reclassification or reassignment of any of the set of virtual machines 310. In some embodiments, the VM management tool 302 can determine that the set of target virtual machines 315 cannot offer what the set of virtual machines 310 would benefit from, and can instead instantiate a set of new virtual machines to support a reclassification or reassignment of the set of virtual machines 310. For example, the VM analysis data 308 can indicate that one of the set of virtual machines 310 would benefit from a reclassification to a 4-processor virtual machine. If none of the set of target virtual machines 315 offers 4 processors, then the VM management tool 302 can instantiate a new virtual machine comprising 4 processors, and can reassign the virtual machine 310 to the instantiated new virtual machine.

As an output, the benefit analysis can yield a determination as to whether it is beneficial, for any reason, to reassign or reclassify one or more of the set of virtual machines 310 to one or more of the set of target virtual machines 315. For example, the benefit analysis can indicate that reassigning each of the set of virtual machines 310 to the set of target virtual machines 315 is beneficial for cost purposes. For further example, the benefit analysis can indicate that instantiating a set of new virtual machines to support operations of a set of existing virtual machines is beneficial for resource consumption purposes. In embodiments, an agreement such as an SLA can be entered into among one or more respective cloud providers, one or more vendors, and/or one or more end users.

In embodiments, the VM management tool 302 can notify the administrator 306 of the benefits of reclassifying or reassigning any of the set of virtual machines 310. In embodiments, the administrator 306 can be notified of any of the results of any of the analysis performed by VM management tool 302, in any way, and via any data communication. Further, in embodiments, the VM management tool 302 can generate or provide a reclassification, reconfiguration, or reassignment recommendation or offer to an administrator, owner, or other user associated with the cloud 102, or other clouds. Further, In embodiments, the offer can be directed to multiple administrators or entities associated with multiple clouds having the capability to support the set of virtual machines 310. It should be appreciated that the administrator 306 or other entity can contact an administrator or a user associated with any existing clouds, in any way, with any type of information or offer.

As an example and as a merely exemplary application of systems and methods as described herein, a cloud administrator may wish to explore options to improve usage of a set of three virtual machines: VM A, VM B, and VM C. In embodiments, analysis data of the set of three virtual machines can be compiled and analyzed by the VM management tool 302 or other logic. The analysis can indicate that VM A would benefit from an upgraded operating system, that VM B is operating efficiently, and that VM C would benefit from a downgrade in memory. The VM management tool 302 or other logic can locate or detect a set of target virtual machines that can be candidates on which to reclassify or migrate VM A and VM C.

In such an exemplary application, the VM management tool 302 or other logic can analyze the set of target virtual machines and determine that a target VM A offers an upgraded operating system and that a target VM C offers a reduced amount of memory. In embodiments, the VM management tool 302 or other logic can run a simulation or model to confirm that reassigning or reclassifying VM A to target VM A is beneficial, and reassigning or reclassifying VM C to target VM C is beneficial. The VM management tool 302 or other logic can reassign or reclassify VM A to target VM A, and VM C to target VM C. In embodiments, the VM management tool 302 or other logic can provide a reassignment or reclassification recommendation to an administrator associated with the virtual machines or an associated cloud network.

Figure 4:
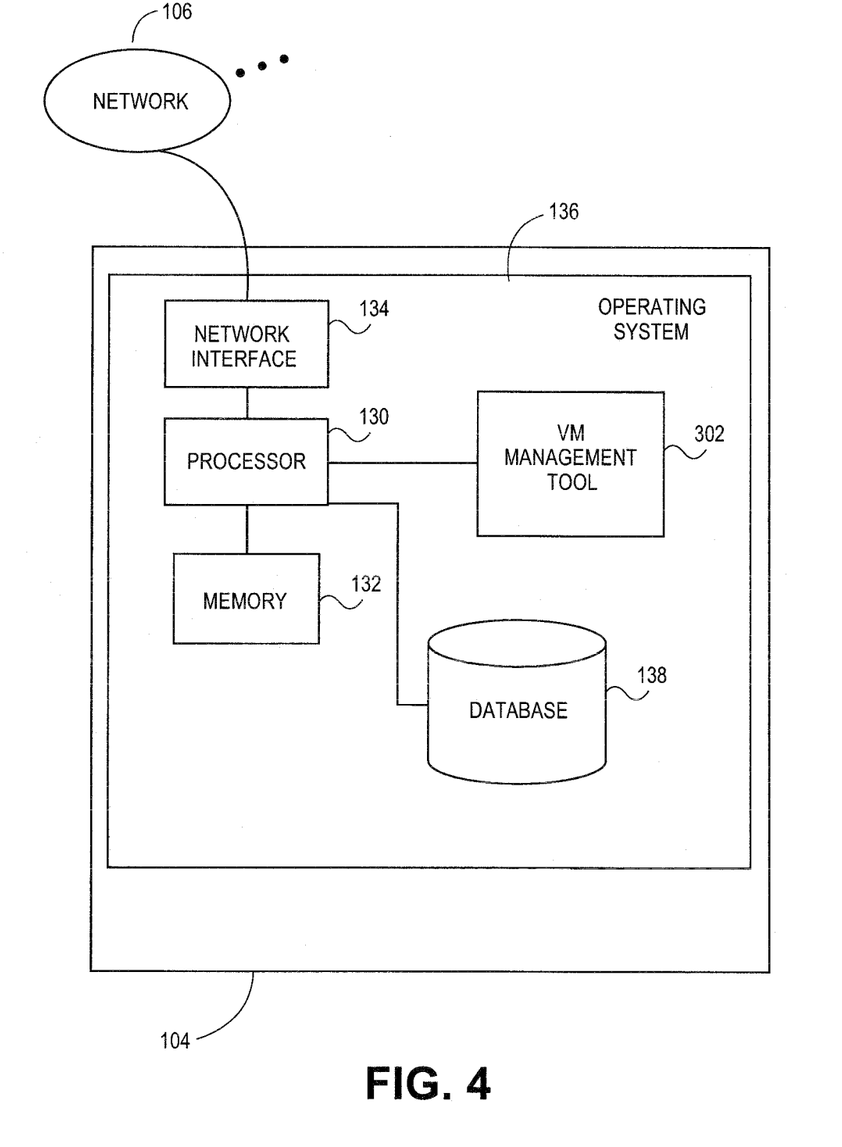
FIG. 4 illustrates an exemplary hardware configuration for a cloud-based management system, according to various embodiments.

FIG. 4 illustrates an exemplary diagram of hardware and other resources that can be incorporated in a cloud management system 104 configured to communicate with a set of instantiated virtual machines 116 (as shown in FIG. 2) via one or more networks 106, according to embodiments. In embodiments as shown, the cloud management system 104 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 also communicates with one or more computer readable storage medium 138, such as hard drives, optical storage, databases, and the like. Processor 130 further communicates with network interface 134, such as an Ethernet or wireless data connection, which in turn communicates with one or more networks 106, such as the Internet or other public or private networks.

Processor 130 can also communicate with computer readable storage medium 138 and the module migration tool 302, to execute control logic, identify usage histories for producing optimized cloud utilization in the cloud 102 as described herein, and control the operation of virtual machines and other resources in cloud 102. Other configurations of cloud management system 104, associated network connections, and other hardware and software resources are possible.

Figure 5:
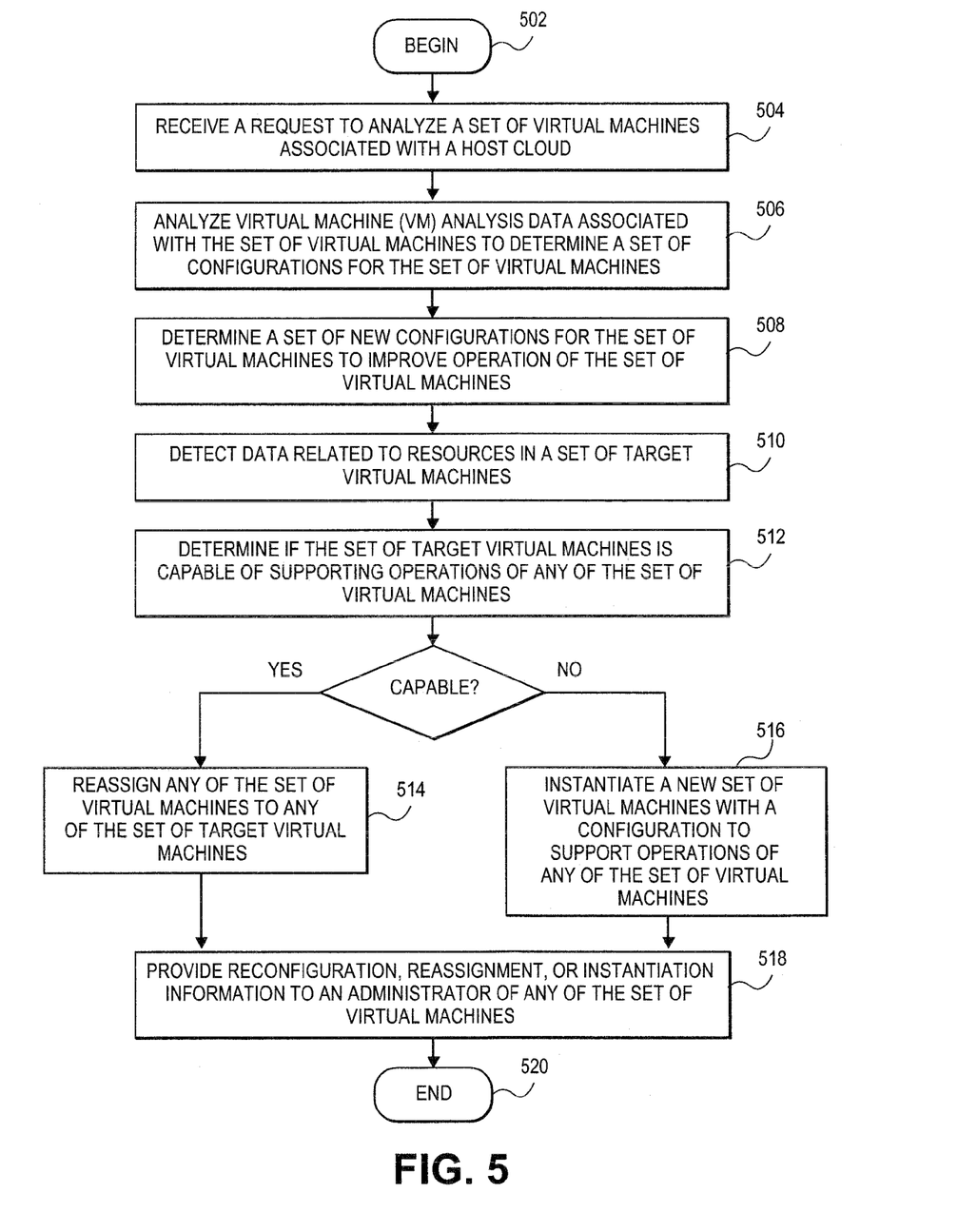
FIG. 5 illustrates a flowchart for migrating system software modules into one or more clouds, according to various embodiments.

FIG. 5 illustrates a flowchart for reclassifying a set of virtual machines to a set of target virtual machines, according to various embodiments. In 502, processing can begin. In 504, a request to analyze a set of virtual machines associated with a host cloud can be received. In embodiments, the request can specify the analysis of a set of appliances. In 506, virtual machine analysis data associated with the set of virtual machines can be analyzed to determine a set of configurations for the set of virtual machines. In embodiments, the virtual machine analysis data can be data associated with program code executed by any software application or program associated with the set of virtual machines. In other embodiments, the program code can be any software application or program capable of being executed on the system.

In 508, a set of new configurations for the set of virtual machines to improve operation of the set of virtual machines can be determined. In embodiments, the set of new configurations can specify any sort of hardware or software associated with the operation of the set of virtual machines. In 510, data related to resources in a set of target virtual machines can be detected. In embodiments, the resources in the set of target virtual machines can be associated with any sort of hardware or software of the set of target virtual machines.

In 512, it can be determined if the set of target virtual machines is capable of supporting operations of any of the set of virtual machines. In embodiments, the determination can be based on whether the resources in the set of target virtual machines can support the set of new configurations needed to improve operation of the set of virtual machines. Further, in embodiments, the set of target virtual machines can offer resources that can improve performance of the operations of the set of virtual machines. In 514, if the set of target virtual machines is capable, any of the set of target virtual machines can be reconfigured or reassigned to support operations of any of the set of virtual machines. In embodiments, one or more of the set of virtual machines can be reassigned to one or more of the set of target virtual machines that can improve performance of the operations of the set of virtual machines. In 516, if the set of target virtual machines is not capable, a new set of virtual machines with a configuration to support operations of any of the set of virtual machines can be instantiated. In embodiments, the new set of virtual machines can be instantiated with the set of new configurations needed to improve operation of the set of virtual machines. In 518, reconfiguration, reassignment, or instantiation information can be provided to an administrator of any of the set of virtual machines. In embodiments, the information can be provided to any administrator or entity associated with the host cloud, set of virtual machines, set of target virtual machines, or new set of virtual machines. In 520, processing can end.

The foregoing description is illustrative, and variations in configuration and implementation may occur to persons skilled in the art. For example, while embodiments have been described which operate using one VM management tool 302 and associated cloud management system 104, in embodiments, one or more of VM management tool 302 and associated cloud management system 104, and/or other servers, data stores, and/or other logic or resources can be used. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
analyzing, by a processor, program code of a first virtual machine to determine an operation of the first virtual machine during a first time period;
analyzing the operation of the first virtual machine;
simulating, in view of the operation of the first virtual machine during the first time period, an operation of the first virtual machine during a second time period that is subsequent to the first time period;
determining, in view of a simulation of the operation of the first virtual machine during the second time period, whether a resource of a target virtual machine supports a virtual machine configuration of the first virtual machine as simulated with respect to the second time period;
in view of a determination that the resources of a target virtual machine supports the virtual machine configuration of the first virtual machine as simulated with respect to the second time period,
terminating the first virtual machine,
instantiating the target virtual machine with the virtual machine configuration, and
migrating operations associated with the first virtual machine to the target virtual machine; and
in view of a determination that one or more resources of the target virtual machine do not support the virtual machine configuration of the first virtual machine as simulated with respect to the second time period, instantiating a new virtual machine with the virtual machine configuration.

2. The method of claim 1, further comprising:
reassigning the first virtual machine to the target virtual machine.

3. The method of claim 1, wherein the target virtual machine is in a cloud network.

4. The method of claim 1, further comprising:
generating a reassignment recommendation to reassign the first virtual machine to the target virtual machine; and
providing the reassignment recommendation to an administrator.

5. The method of claim 1, wherein the determining is further in view of a metric of the first virtual machine.

6. The method of claim 5, wherein the virtual machine configuration improves the metric.

7. A system comprising:
a memory; and
a processor, operatively coupled to the memory, to:
analyze program code of a first virtual machine to determine an operation of the first virtual machine during a first time period;
simulate, in view of the operation of the first virtual machine during the first time period, an operation of the first virtual machine during a second time period that is subsequent to the first time period;
determine, in view of a simulation of the operation of the first virtual machine during the second time period, whether a resource of a target virtual machine supports a virtual machine configuration of the first virtual machine as simulated with respect to the second time period, wherein the target virtual machine is in a cloud network;
in view of a determination that the resource of a target virtual machine supports the virtual machine configuration of the first virtual machine as simulated with respect to the second time period, terminate the first virtual machine,
instantiate the target virtual machine with the virtual machine configuration, and
migrate operations associated with the first virtual machine to the target virtual machine; and
in view of a determination that one or more resources of the target virtual machine do not support the virtual machine configuration of the first virtual machine as simulated with respect to the second time period, instantiate a new virtual machine with the virtual machine configuration.

8. The system of claim 7, wherein the processor is further to analyze the operation of the first virtual machine.

9. The system of claim 7, wherein the processor is further to
reassign the first virtual machine to the target virtual machine.

10. The system of claim 7, wherein the processor is further to:
generate a reassignment recommendation to reassign the first virtual machine to the target virtual machine; and
provide the reassignment recommendation to an administrator.

11. The system of claim 7, wherein to determine whether a resource of a target virtual machine supports a virtual machine configuration of the first virtual machine as simulated with respect to the second time period is further in view of a metric of the first virtual machine.

12. The system of claim 11, wherein the virtual machine configuration improves the metric.

13. A system comprising:
a memory; and
a processor, operatively coupled to the memory, to:
analyze program code of a first virtual machine to determine an operation of the first virtual machine during a first time period;
simulate, in view of the operation of the first virtual machine during the first time period, an operation of the first virtual machine during a second time period that is subsequent to the first time period;
determine, in view of a simulation of the operation of the first virtual machine during the second time period, whether a resource of a target virtual machine supports a virtual machine configuration of the first virtual machine as simulated with respect to the second time period;
in view of a determination that the resource of a target virtual machine supports the virtual machine configuration of the first virtual machine as simulated with respect to the second time period,
terminate the first virtual machine,
instantiate the target virtual machine with the virtual machine configuration, and
migrate operations associated with the first virtual machine to the target virtual machine; and
in view of a determination that one or more resources of the target virtual machine do not support the virtual machine configuration of the first virtual machine as simulated with respect to the second time period, instantiate a new virtual machine with the virtual machine configuration; and
reassign the first virtual machine to the target virtual machine.

14. The system of claim 13, wherein the processor is further to, prior to the reassign of the first virtual machine:
generate a reassignment recommendation to reassign the first virtual machine to the target virtual machine; and
provide the reassignment recommendation to an administrator; and
receive an input to reassign the first virtual machine.

* * * * *